(12) United States Patent
Trublowski et al.

(10) Patent No.: US 10,966,305 B2
(45) Date of Patent: Mar. 30, 2021

(54) INTEGRATED ANTENNA ASSEMBLIES FOR LIGHT FIXTURES

(71) Applicant: SIGNIFY HOLDING B.V., Eindhoven (NL)

(72) Inventors: John Trublowski, Troy, MI (US); Sridhar Reddy Nimma, Cumming, GA (US); Matthew Alan Davis, Orange, CA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/240,026

(22) Filed: Jan. 4, 2019

(65) Prior Publication Data

US 2019/0215935 A1     Jul. 11, 2019

Related U.S. Application Data

(60) Provisional application No. 62/613,539, filed on Jan. 4, 2018.

(51) Int. Cl.
| | |
|---|---|
| *H05B 47/19* | (2020.01) |
| *H05B 47/105* | (2020.01) |
| *H01Q 1/22* | (2006.01) |
| *H01Q 1/42* | (2006.01) |
| *H01Q 9/04* | (2006.01) |
| *H01Q 1/44* | (2006.01) |

(52) U.S. Cl.
CPC .......... *H05B 47/19* (2020.01); *H01Q 1/2216* (2013.01); *H01Q 1/2283* (2013.01); *H01Q 1/42* (2013.01); *H01Q 1/44* (2013.01); *H01Q 9/0407* (2013.01); *H05B 47/105* (2020.01)

(58) Field of Classification Search
CPC .......... H01Q 1/44; H01Q 1/2283; H01Q 1/42; H01Q 9/0407; H05B 47/19; H05B 47/105
See application file for complete search history.

(56) References Cited

U.S. PATENT DOCUMENTS

| | | | | |
|---|---|---|---|---|
| 2012/0038281 A1* | 2/2012 | Verfuerth | ............. | H05B 47/105 315/152 |
| 2014/0125250 A1* | 5/2014 | Wilbur | ................. | H01Q 1/2291 315/297 |
| 2014/0265874 A1* | 9/2014 | Marquardt | ............. | F21S 8/086 315/153 |
| 2014/0292208 A1* | 10/2014 | Chemel | ................. | H05B 47/16 315/154 |
| 2015/0305111 A1* | 10/2015 | Bortolotti | ........... | F21V 23/0414 315/152 |

(Continued)

FOREIGN PATENT DOCUMENTS

| | | | | |
|---|---|---|---|---|
| WO | WO-2012008653 A1 * | 1/2012 | ........... | H01Q 21/065 |
| WO | WO-2015160564 A2 * | 10/2015 | .......... | F21V 23/0407 |

*Primary Examiner* — Borna Alaeddini

(57) ABSTRACT

A light fixture disposed in an ambient environment. The light fixture can include at least one light source, and a sensor module that measures a parameter, where the parameter is used to operate the at least one light source. The light fixture can also include an antenna assembly coupled to the sensor module, where at least a portion of the antenna assembly is disposed on an exposed component, where the exposed component has a substantially unobstructed line of sight with the ambient environment, where the antenna assembly is used to measure the parameter in the ambient environment.

20 Claims, 7 Drawing Sheets

(56) References Cited

U.S. PATENT DOCUMENTS

2016/0095193 A1* 3/2016 Mokhtari .............. H04W 12/02
    315/307
2016/0381768 A1* 12/2016 Noesner ................ H05B 47/19
    315/153
2017/0307192 A1* 10/2017 LaFemina ............. F21V 21/108

* cited by examiner

INTEGRATED ANTENNA ASSEMBLIES FOR LIGHT FIXTURES

CROSS-REFERENCE TO RELATED APPLICATIONS

This application claims priority under 35 U.S.C. § 119 to U.S. Provisional Patent Application Ser. No. 62/613,539, titled "Integrated Antenna Assemblies For Light Fixtures" and filed on Jan. 4, 2018, the entire contents of which are hereby incorporated herein by reference.

TECHNICAL FIELD

Embodiments described herein relate generally to light fixtures, and more particularly to systems, methods, and devices for integrated antenna assemblies for light fixtures.

BACKGROUND

In an effort to conserve energy, one or more sensors (e.g., occupancy sensors, ambient light sensors) are used in lighting systems. In such a case, these sensors can be integrated with a control system. For example, when an occupancy sensor detects that one or more people are in a volume of space, a control system for one or more light fixtures in a lighting system will provide power and/or control signals to those light fixtures, causing those light fixtures to illuminate. Conversely, when the occupancy sensor fails to detect that one or more people are in a volume of space, a control system for one or more light fixtures in a lighting system will cause those light fixtures to stop illuminating.

SUMMARY

In general, in one aspect, the disclosure relates to a light fixture disposed in an ambient environment. The light fixture can include at least one light source. The light fixture can also include a sensor module that measures a parameter, where the parameter is used to operate the at least one light source. The light fixture can further include an antenna assembly coupled to the sensor module, where at least a portion of the antenna assembly is disposed on an exposed component, where the exposed component has a substantially unobstructed line of sight with the ambient environment, where the antenna assembly is used to measure the parameter in the ambient environment.

In another aspect, the disclosure can generally relate to a sensor module for detecting occupancy for operation of a light fixture. The sensor module can include an antenna assembly that sends and receives radio frequency signals. The sensor module can also include an occupancy sensor coupled to the antenna assembly, where the occupancy sensor generates the signals that are sent by the antenna assembly, where the occupancy sensor interprets the signals that are received by the antenna assembly. At least a portion of the antenna assembly can be configured to be integrated with an exposed component of the light fixture, where the exposed component has a substantially unobstructed line of sight with the ambient environment.

These and other aspects, objects, features, and embodiments will be apparent from the following description and the appended claims.

BRIEF DESCRIPTION OF THE DRAWINGS

The drawings illustrate only example embodiments of integrated antenna assemblies (or, more simply, antennae) for light fixtures and are therefore not to be considered limiting of its scope, as integrated antennae for light fixtures may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

Figure 1:
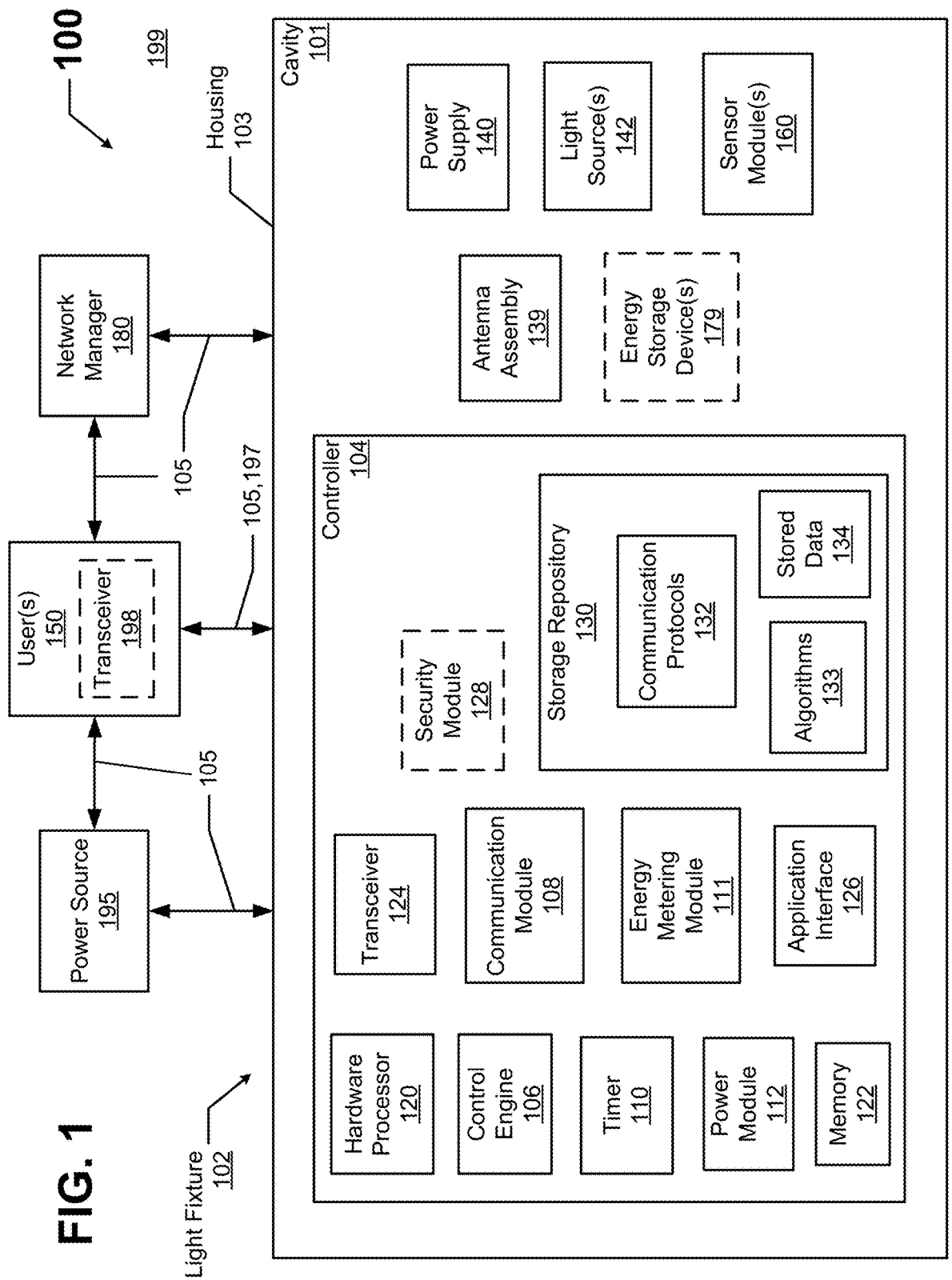
FIG. 1 shows a diagram of a lighting system that includes a light fixture in accordance with certain example embodiments.

The example embodiments discussed herein are directed to systems, methods, and devices for integrated antennae for light fixtures. While example embodiments are described herein as being directed toward occupancy sensors using RFID antennae, example embodiments can be directed toward any other type of sensor or other components that can use an antenna. Further, example antennae can communicate using any of a number of different technologies and/or protocols. Such other technologies and protocols can include, but are not limited to, WiFi, Bluetooth, Bluetooth Low Energy (BLE), Zigbee, ultraviolet waves, microwaves, and infrared signals.

Further, example integrated antennae can be used with one or more of a number of other electrical devices in addition to, or as an alternative to, light fixtures. Such other electrical devices can include, but are not limited to, a light switch, a control panel, a wall outlet, a smoke detector, a $CO_2$ monitor, a motion detector, a broken glass sensor, and a camera. Example embodiments can be used for a volume of space having any size and/or located in any environment (e.g., indoor, outdoor, hazardous, non-hazardous, high humidity, low temperature, corrosive, sterile, high vibration).

Light fixtures described herein can use one or more of a number of different types of light sources, including but not limited to light-emitting diode (LED) light sources, fluorescent light sources, organic LED light sources, incandescent light sources, and halogen light sources. Therefore, light fixtures described herein, even in hazardous locations, should not be considered limited to a particular type of light source. Further, a light source with which example integrated antennae can be used can be any of a number of types of light fixtures. Examples of such types of light fixtures can include, but are not limited to, a down can light, a pendant light, a street light, a Hi-Bay light, a floodlight, a beacon, a desk lamp, an emergency egress light, and a light integrated with a ceiling fan.

In certain example embodiments, light fixtures (or other devices) that include example integrated antennae are subject to meeting certain standards and/or requirements. For example, the National Electric Code (NEC), Underwriters Laboratory (UL), the National Electrical Manufacturers Association (NEMA), the International Electrotechnical Commission (IEC), the Federal Communication Commission (FCC), and the Institute of Electrical and Electronics Engineers (IEEE) set standards as to electrical enclosures (e.g., light fixtures), wiring, and electrical connections. Use of example embodiments described herein meet (and/or allow a corresponding device to meet) such standards when required. In some (e.g., PV solar) applications, additional standards particular to that application may be met by the light fixtures or other electrical devices described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of integrated antennae for light fixtures will be described more fully hereinafter with reference to the accompanying drawings, in which example embodiments integrated antennae for light fixtures are shown. Integrated antennae for light fixtures may, however, be embodied in many different forms and should not be construed as limited to the example embodiments set forth herein. Rather, these example embodiments are provided so that this disclosure will be thorough and complete, and will fully convey the scope of integrated antennae for light fixtures to those of ordinary skill in the art. Like, but not necessarily the same, elements (also sometimes called components) in the various figures are denoted by like reference numerals for consistency.

Terms such as "first", "second", "on", "upon", "outer", "inner", "top", "bottom", and "within" are used merely to distinguish one component (or part of a component or state of a component) from another. Such terms are not meant to denote a preference or a particular orientation, and are not meant to limit embodiments of integrated antennae for light fixtures. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system diagram of a lighting system 100 in a volume of space 199 that includes an integrated antenna 139 (also called an antenna assembly 139 herein) for a light fixture 102 in accordance with certain example embodiments. The lighting system 100 can include a power source 195, one or more users 150, a network manager 180, and at least one light fixture 102. In addition to the one or more antennae assemblies 139, the light fixture 102 can include a controller 104, one or more optional energy storage devices 179, one or more sensor modules 160 (also sometimes more simply called a sensor 160 herein), at least one power supply 140, and at least one light source 142.

The controller 104 can include one or more of a number of components. As shown in FIG. 1, such components can include, but are not limited to, a control engine 106, a communication module 108, a timer 110, an energy metering module 111, a power module 112, a storage repository 130, a hardware processor 120, a memory 122, a transceiver 124, an application interface 126, and, optionally, a security module 128. The components shown in FIG. 1 are not exhaustive, and in some embodiments, one or more of the components shown in FIG. 1 may not be included in an example light fixture. Any component of the example light fixture 102 can be discrete or combined with one or more other components of the light fixture 102.

As discussed above, the volume of space 199 can be indoors or outdoors. The volume of space 199 can be well defined (e.g., walls, ceiling, floor) and/or unbounded. The latter case, a volume of space 199 can be somewhat limited by some other factor, such as the communication range of a sensor module 160 and/or an antenna assembly 139. The volume of space 199 can be located in one or more of any type of environment, including but not limited to hot, cold, humid, wet, dry, climate-controlled, sterile, and windowless.

A user 150 can be any person that interacts with light fixtures or components thereof (e.g., an antenna assembly 139, a sensor module 160). Examples of a user 150 may include, but are not limited to, an occupant in the volume of space 199, an engineer, an electrician, an instrumentation and controls technician, a mechanic, an operator, a consultant, an inventory management system, an inventory manager, a foreman, a labor scheduling system, a contractor, and a manufacturer's representative. The user 150 can use a user system (not shown), which may include a display (e.g., a GUI). The user 150 interacts with (e.g., sends data to, receives data from) the controller 104 of the light fixture 102 via the application interface 126 (described below). The user 150 can also interact with a network manager 180 and/or one or more of the sensor modules 160.

Each user 150 can optionally include a transceiver 198 for sending communication signals 197 to and/or receiving communication signals 197 from the antenna assembly 139. The optional transceiver 198 of a user 150 can be substantially the same as the transceiver 124 (described below) of the controller 104. The transceiver 197 can have one or more of any of a number of operating configurations, including but not limited to passive, powered passive, and powered active. A communication signal 197 (also sometimes referred to herein as simply a signal 197) can be any type of signal, including but not limited to a RF signal.

Interaction between the user 150 and the light fixture 102, the network manager 180, the power source 195, and the sensor modules 160 is conducted using communication links 105. Each communication link 105 can include wired (e.g., Class 1 electrical cables, Class 2 electrical cables, electrical connectors, power line carrier, DALI, RS485) and/or wireless (e.g., Wi-Fi, visible light communication, cellular networking, Bluetooth, WirelessHART, ISA100) technology. For example, a communication link 105 can be (or include) one or more electrical conductors that are coupled to the housing 103 of the light fixture 102 and to a sensor module 160. The communication link 105 can transmit signals (e.g., power signals, communication signals, control signals, data) between the light fixture 102 and the user 150, the network manager 180, the power source 195, and/or one or more of the sensor modules 160.

The network manager 180 is a device or component that controls all or a portion of a communication network that includes the controller 104 of the light fixture 102, additional light fixtures, and the sensor modules 160 that are communicably coupled to the controller 104. The network manager 180 can be substantially similar to the controller 104. Alternatively, the network manager 180 can include one or more of a number of features in addition to, or altered from, the features of the controller 104 described below. As described herein, communication with the network manager 180 can include communicating with one or more other components (e.g., another light fixture) of the system 100. In such a case, the network manager 180 can facilitate such communication.

The power source 195 of the system 100 provides AC mains or some other form of power to the light fixture 102, as well as to one or more other components (e.g., the network manager 180) of the system 100. The power source 195 can include one or more of a number of components. Examples of such components can include, but are not limited to, an electrical conductor, a coupling feature (e.g., an electrical connector), a transformer, an inductor, a resistor, a capacitor, a diode, a transistor, and a fuse. The power source 195 can be, or include, for example, a wall outlet, an energy storage device (e.g. a battery, a supercapacitor), a circuit breaker, and/or an independent source of generation (e.g., a photovoltaic solar generation system). The power source 195 can also include one or more components (e.g., a switch, a relay, a controller) that allow the power source 195 to communicate with and/or follow instructions from the user 150, the controller 104, and/or the network manager 180.

An optional energy storage device 179 can be any of a number of rechargeable batteries or similar storage devices that are configured to charge using some source of power (e.g., the primary power provided to the light fixture, ultraviolet rays). The energy storage device 179 can use one or more of any type of storage technology, including but not limited to a battery, a flywheel, an ultracapacitor, and a supercapacitor. If the energy storage device 179 includes a battery, the battery technology can vary, including but not limited to lithium ion, nickel-cadmium, lead/acid, solid state, graphite anode, titanium dioxide, nickel cadmium, nickel metal hydride, nickel iron, alkaline, and lithium polymer. In some cases, one or more of the energy storage devices 179 charge using a different level and/or type of power relative to the level and type of power of the primary power. In such a case, the power supply 179 can convert, invert, transform, and/or otherwise manipulate the primary power to the level and type of power used to charge the energy storage devices 179. There can be any number of energy storage devices 179.

The antenna assembly 139 can be any assembly of components that is used to improve the ability of the light fixture 102 (or portion thereof, such as the transceiver 124 or a sensor module 160) to send and/or receive signals 197 with the network manager 180, the power source 195, the user 150 (including an optional transceiver 198), another light fixture, a remote sensor module 160, and/or some other device within the lighting system 100. The antenna assembly 139 can be used to convert electrical power into radio waves and/or convert radio waves into electrical power. An antenna assembly 139 can be used with a single component (e.g., only a sensor module 160) of the light fixture 102. Alternatively, an antenna assembly 139 can be used with multiple components (e.g., a sensor module 160, the controller 104) of the light fixture 102.

Figure 5:
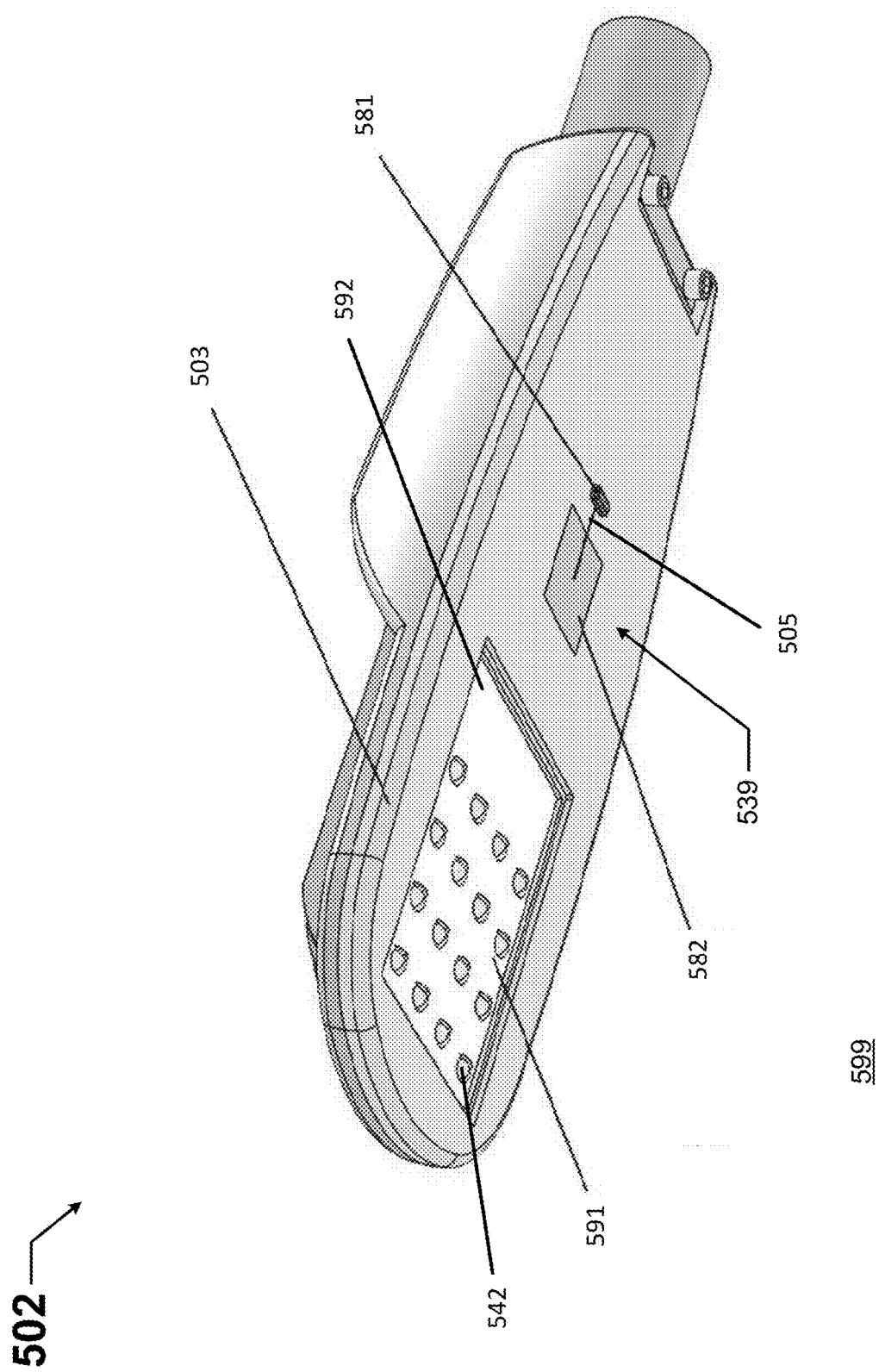
FIG. 5 shows a light fixture with an antenna assembly in accordance with certain example embodiments.
Figure 6:
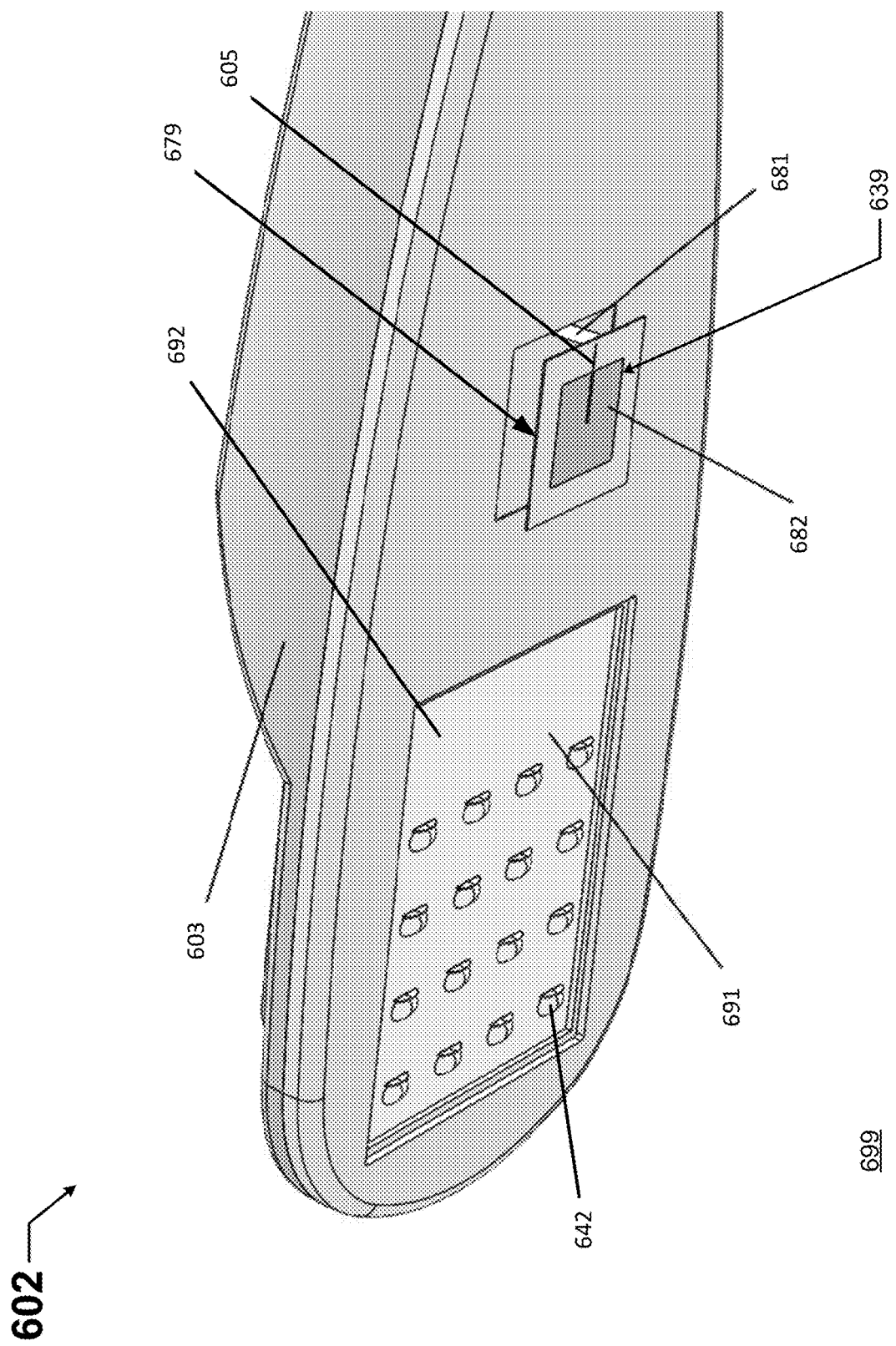
FIG. 6 shows a light fixture with an antenna assembly in accordance with certain example embodiments.
Figure 7:
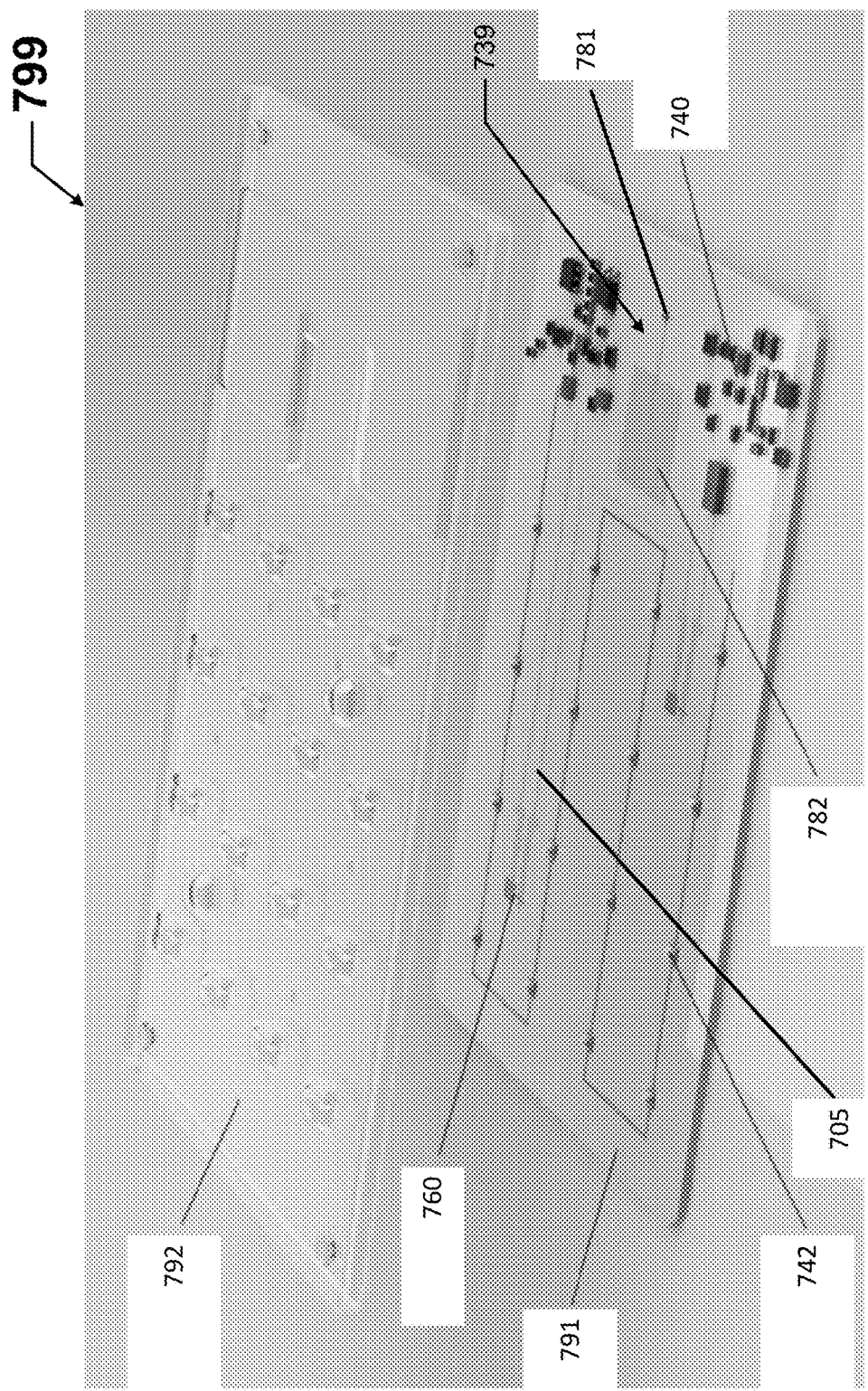
FIG. 7 shows a subassembly of another light fixture in accordance with certain example embodiments.

The antenna assembly 139 in example embodiments can be at least partially disposed within the housing 103 of the light fixture 102. For example, as shown in FIG. 7, the antenna assembly 139 can be disposed within the housing 103 (for example, as defined in part by the lens 692) of the light fixture 102. As another example, as shown in FIGS. 5 and 6, the entire antenna assembly 139 (or portions thereof) can be disposed on (integrated with) the housing 103 of the light fixture 102. Example antenna assemblies 139 (or portions thereof) described herein can be printed on an outer surface of the housing 103 of the light fixture 102 or printed on an information medium (e.g., a warning label, a nameplate) that is adhered or otherwise coupled to the outer surface of the housing 103 of the light fixture 102.

In certain example embodiments, the antenna assembly 139 includes one or more of a number of components. Such components can include, but are not limited to, one or more antennae, a receiver, a transmitter, a balun, a block upconverter, a cable (e.g., a coaxial cable or other form of communication link 105), a counterpoise (a type of ground system), a feed, a passive radiator, a feed line, a rotator, a tuner, a low-noise block downconverter, and a twin lead. Portions of the antenna assembly 139 can be in direct communication with, or can be shared with, one or more components (e.g., the communications module 108) of the controller 104 and/or a sensor module 160. For example, the transceiver 124 of the controller 104 and/or a sensor module 160 can be in direct communication with the antenna assembly 139.

The one or more sensor modules 160 can include any type of sensing device that measure one or more parameters. Examples of types of sensor modules 160 can include, but are not limited to, a passive infrared sensor, a photocell, a pressure sensor, an air flow monitor, a gas detector, and a resistance temperature detector. A parameter that can be measured by a sensor module 160 can include, but is not limited to, occupancy, motion, an amount of ambient light, temperature within the housing 103 of the light fixture 102, humidity within the housing 103 of the light fixture 102, air quality within the housing 103 of the light fixture 102, vibration, pressure, air flow, smoke (as from a fire), temperature (e.g., excessive heat, excessive cold, an ambient temperature) outside the housing 103 of the light fixture 102.

In some cases, if the sensor module 160 is configured to detect occupancy in the volume of space 199, the sensor module 160, using the antenna assembly 139 to send and receive RF signals 197, can measure one or more characteristics (e.g., frequency, amplitude) of each RF signal 197. In this way, for example, any change in such a characteristic of a RF signal 197 can be an indication of movement of a user 150 within the volume of space 199. More details about the antenna assembly 139 associated with a sensor module 160 are provided in the figures below.

In some cases, the parameter or parameters measured by a sensor module 160 can be used to operate one or more light sources 142 of the light fixture 102. Each sensor module 160 can use one or more of a number of communication protocols. A sensor module 160 can be associated with the light fixture 102 or another light fixture in the system 100. A sensor module 160 can be located within the housing 103 of the light fixture 102, disposed on the housing 103 of the light fixture 102, or located outside the housing 103 of the light fixture 102.

In certain example embodiments, a sensor module 160 can include an energy storage device (e.g., a battery) that is used to provide power, at least in part, to some or all of the sensor module 160. In such a case, the energy storage device can be the same as, or independent of, the energy storage device 179, described above, of the light fixture 102. The energy storage device of the sensor module 160 can operate at all time or when a primary source of power to the light fixture 102 is interrupted. Further, a sensor module 160 can utilize or include one or more components (e.g., memory 122, storage repository 130, transceiver 124) found in the controller 104. In such a case, the controller 104 can provide the functionality of these components used by the sensor module 160. Alternatively, the sensor module 160 can include, either on its own or in shared responsibility with the controller 104, one or more of the components of the controller 104. In such a case, the sensor module 160 can correspond to a computer system as described below with regard to FIG. 2.

The user 150, the network manager 180, the power source 195, and/or the sensor modules 160 can interact with the controller 104 of the light fixture 102 using the application interface 126 in accordance with one or more example embodiments. Specifically, the application interface 126 of the controller 104 receives data (e.g., information, communications, instructions, updates to firmware) from and sends data (e.g., information, communications, instructions) to the user 150, the network manager 180, the power source 195, and/or each sensor module 160. The user 150, the network manager 180, the power source 195, and/or each sensor module 160 can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150, the network manager 180, the power source 195, and/or the sensor modules 160 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, sensor software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The light fixture 102 can include a housing 103. The housing 103 can include at least one wall that forms a cavity 101. In some cases, the housing can be designed to comply with any applicable standards so that the light fixture 102 can be located in a particular environment (e.g., outdoors, in an indoor "clean room") or volume of space 199.

The housing 103 of the light fixture 102 can be used to house one or more components of the light fixture 102, including one or more components of the controller 104. For example, as shown in FIG. 1, the controller 104 (which in this case includes the control engine 106, the communication module 108, the timer 110, the energy metering module 111, the power module 112, the storage repository 130, the hardware processor 120, the memory 122, the transceiver 124, the application interface 126, and the optional security module 128), one or more of the sensor modules 160, one or more antenna assemblies 139, the power supply 140, and the light sources 142 are disposed in the cavity 101 formed by the housing 103. In alternative embodiments, any one or more of these or other components of the light fixture 102 can be disposed on the housing 103 and/or remotely from the housing 103. For instance, an example antenna assembly 139 (or portion thereof) can be integrated with the housing 103.

The storage repository 130 can be a persistent storage device (or set of devices) that stores software and data used to assist the controller 104 in communicating with the user 150, the network manager 180, the power source 195, and one or more sensor modules 160 within the system 100. In one or more example embodiments, the storage repository 130 stores one or more communication protocols 132, algorithms 133, and stored data 134. The communication protocols 132 can be any of a number of protocols that are used to send and/or receive data between the controller 104 and the user 150, the network manager 180, the power source 195, and one or more sensor modules 160.

One or more of the communication protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 132 can provide a layer of security to the data transferred within the system 100. Other protocols 132 can be associated with the use of Wi-Fi, Zigbee, visible light communication, cellular networking, BLE, and Bluetooth.

The algorithms 133 can be any procedures (e.g., a series of method steps), formulas, logic steps, mathematical models, forecasts, simulations, and/or other similar operational procedures that the control engine 106 of the controller 104 follows based on certain conditions at a point in time. An example of an algorithm 133 is measuring (using the energy metering module 111), storing (using the stored data 134 in the storage repository 130), and evaluating the current and voltage delivered to and delivered by the power supply 140 over time.

Algorithms 133 can be focused on certain components of the light fixture 102. For example, one or more algorithms 133 can facilitate communication between a sensor module 160 and the control engine 106 of the controller 104. As a specific example, one or more algorithms 133 can be used by the control engine 106 to instruct a sensor module 160 (in some cases, using an antenna assembly 139) to measure a parameter, for the sensor module 160 to send the measurement to the control engine 106, for the control engine 106 to analyze the measurement, (stored as stored data 134) and for the control engine 106 to take an action (e.g., instruct, using a communication protocol 132, one or more other components of the light fixture 102 to operate) based on the result (stored as stored data 134) of the analysis.

As another example, one or more algorithms 133 can facilitate communication between an antenna assembly 139 and a sensor module 160 and/or the control engine 106 of the controller 104. As a specific example, one or more algorithms 133 can be used by the control engine 106 to receive a measurement (using a communication protocol 132) made by a sensor module 160 using an antenna assembly 139, for the control engine 106 to analyze the measurement, and for the control engine 106 to take an action (e.g., instruct one or more other components of the light fixture 102 to operate) based on the result of the analysis. As another specific example, one or more algorithms 133 can be used by the control engine 106 to determine that a communication to a device external to the light fixture 102 needs to be sent, and to send a communication signal 197 (using a communication protocol 132 and saved as stored data 134) using the antenna assembly 139.

Stored data 134 can be any data associated with the light fixture 102 (including other light fixtures and/or any components thereof), any measurements taken by the sensor modules 160, measurements taken by the energy metering module 111, threshold values, results of previously run or calculated algorithms, and/or any other suitable data. Such data can be any type of data, including but not limited to historical data for the light fixture 102, historical data for other light fixtures, calculations, measurements taken by the energy metering module 111, and measurements taken by one or more sensor modules 160. The stored data 134 can be associated with some measurement of time derived, for example, from the timer 110.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the communication protocols 132, the algorithms 133, and/or the stored data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the network manager 180, the power source 195, and the sensor modules 160 in the system 100. More specifically, the control engine 106 sends information to and/or receives information from the storage repository 130 in order to communicate with the user 150, the network manager 180, the power source 195, and the sensor modules 160. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, the control engine 106 can activate the communication module 108 when the communication module 108 is in "sleep" mode and when the communication module 108 is needed to send data received from another component (e.g., a sensor module 160, the user 150) in the system 100.

As another example, the control engine 106 can acquire the current time using the timer 110. The timer 110 can enable the controller 104 to control the light fixture 102 even when the controller 104 has no communication with the network manager 180. As yet another example, the control engine 106 can direct the energy metering module 111 to measure and send power consumption information of the light fixture 102 to the network manager 180. In some cases, the control engine 106 of the controller 104 can generate and send a dimming signal (e.g., 0-10 V DC) to the power supply 140, which causes the power supply 140 to adjust the light output of the light sources 142.

The control engine 106 of the controller 104 can communicate, in some cases using the antenna assembly 139, with one or more of the sensor modules 160 and make determinations based on measurements made by the sensor modules 160 (which can use example antennae assemblies 139). For example, the control engine 106 can use one or more algorithms 133 to facilitate communication with a sensor module 160. As a specific example, the control engine 160 can use one or more algorithms 133 to instruct a sensor module 160 to measure (in some cases using an antenna assembly 139) a parameter, for the sensor module 160 to send the measurement to the control engine 106, for the control engine 106 to analyze the measurement, (stored as stored data 134) and for the control engine 106 to take an action (e.g., instruct, using a communication protocol 132, one or more other components of the light fixture 102 to operate) based on the result (stored as stored data 134) of the analysis.

The control engine 106 can also use the antenna assembly 139 to send and/or receive communications. As a specific example, the control engine 106 can use one or more algorithms 133 to receive (using a communication protocol 132) a signal received by the antenna assembly 139, for the control engine 106 to analyze the signal, and for the control engine 106 to take an action (e.g., instruct one or more other components of the light fixture 102 to operate) based on the result of the analysis. As another specific example, the control engine 106 can use one or more algorithms 133 to determine that a communication to a device external to the light fixture 102 needs to be sent, and to send a communication signal 197 (using a communication protocol 132 and saved as stored data 134) using the antenna assembly 139.

The control engine 106 can provide, in some cases using an antenna assembly 139, control signals, communication signals 197, and/or other types of signals to a user 150 (including an optional transceiver 198), the network manager 180, the power source 195, and one or more of the sensor modules 160. Similarly, the control engine 106 can receive, in some cases using the antenna assembly 139, control signals, communication signals 197, and/or other types of signals from a user 150 (including an optional transceiver 198), the network manager 180, the power source 195, and one or more of the sensor modules 160. The control engine 106 can control each sensor module 160 automatically (for example, based on one or more algorithms stored in the control engine 106) and/or based on control signals, communication signals 197, and/or other types of signals received from another device through a communication link 105. The control engine 106 may include a printed circuit board, upon which the hardware processor 120 and/or one or more discrete components of the controller 104 are positioned.

In certain embodiments, the control engine 106 of the controller 104 can communicate, in some cases using the antenna assembly 139, with one or more components of a system external to the system 100. For example, the control engine 106 can interact with an inventory management system by ordering a light fixture (or one or more components thereof) to replace the light fixture 102 (or one or more components thereof) that the control engine 106 has determined to fail or be failing. As another example, the control engine 106 can interact with a workforce scheduling system by scheduling a maintenance crew to repair or replace the light fixture 102 (or portion thereof) when the control engine 106 determines that the light fixture 102 or portion thereof requires maintenance or replacement. In this way, the controller 104 is capable of performing a number of functions beyond what could reasonably be considered a routine task.

In certain example embodiments, the control engine 106 can include an interface that enables the control engine 106 to communicate with one or more components (e.g., power supply 140) of the light fixture 102. For example, if the power supply 140 of the light fixture 102 operates under IEC Standard 62386, then the power supply 140 can have a serial communication interface that will transfer data (e.g., stored data 134) measured by the sensor modules 160. In such a case, the control engine 106 can also include a serial interface to enable communication with the power supply 140 within the light fixture 102. Such an interface can operate in conjunction with, or independently of, the communication protocols 132 used to communicate between the controller 104 and the user 150, the network manager 180, the power source 195, and the sensor modules 160.

The control engine 106 (or other components of the controller 104) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I2C), and a pulse width modulator (PWM).

The communication module 108 of the controller 104 determines and implements the communication protocol (e.g., from the communication protocols 132 of the storage repository 130) that is used when the control engine 106 communicates with (e.g., sends signals to, receives signals from) a user 150 (including an optional transceiver 198), the network manager 180, the power source 195, and/or one or more of the sensor modules 160. In some cases, the communication module 108 accesses the stored data 134 to determine which communication protocol is used to communicate with the sensor module 160 associated with the stored data 134. In addition, the communication module 108 can interpret the communication protocol of a communication received by the controller 104 so that the control engine 106 can interpret the communication.

The communication module 108 can send and receive data, in some cases using the antenna assembly 139, between the network manager 180, the power source 195, the sensor modules 160, and/or the users 150 (including an optional transceiver 198) and the controller 104. The communication module 108 can send and/or receive data in a given format that follows a particular communication protocol 132. The control engine 106 can interpret the data packet received from the communication module 108 using the communication protocol 132 information stored in the storage repository 130. The control engine 106 can also facilitate the data transfer between one or more sensor modules 160 and the network manager 180 or a user 150 by converting the data into a format understood by the communication module 108.

The communication module 108 can send data (e.g., communication protocols 132, algorithms 133, stored data 134, operational information, alarms) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can track time periods based on an instruction received from the control engine 106, based on an instruction received from the user 150, based on an instruction programmed in the software for the controller 104, based on some other condition or from some other component, or from any combination thereof.

The timer 110 can be configured to track time when there is no power delivered to the controller 104 (e.g., the power module 112 malfunctions) using, for example, a super capacitor or a battery backup. In such a case, when there is a resumption of power delivery to the controller 104, the timer 110 can communicate any aspect of time to the controller 104. In such a case, the timer 110 can include one or more of a number of components (e.g., a super capacitor, an integrated circuit) to perform these functions.

The energy metering module 111 of the controller 104 measures one or more components of power (e.g., current, voltage, resistance, VARs, watts) at one or more points within the light fixture 102. The energy metering module 111 can include any of a number of measuring devices and related devices, including but not limited to a voltmeter, an ammeter, a power meter, an ohmmeter, a current transformer, a potential transformer, and electrical wiring. The energy metering module 111 can measure a component of power continuously, periodically, based on the occurrence of an event, based on a command received from the control module 106, and/or based on some other factor. For purposes herein, the energy metering module 111 can be considered a type of sensor (e.g., sensor module 160). In this way, a component of power measured by the energy metering module 111 can be considered a parameter herein.

In certain example embodiments, the power module 112 of the controller 104 receives power from the power supply 195 and manipulates (e.g., transforms, rectifies, inverts) that power to provide the manipulated power to one or more other components (e.g., timer 110, control engine 106) of the controller 104. Alternatively, in certain example embodiments, the power module 112 can provide power to the power supply 140 of the light fixture 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112.

The power module 112 can include one or more components (e.g., a transformer, a diode bridge, an inverter, a converter) that receives power (for example, through an electrical cable) from a source external to the light fixture 102 and generates power of a type (e.g., alternating current, direct current) and level (e.g., 12V, 24V, 120V) that can be used by the other components of the controller 104 and/or by the power supply 140. The power module 112 can use a closed control loop to maintain a preconfigured voltage or current with a tight tolerance at the output. The power module 112 can also protect the rest of the electronics (e.g., hardware processor 120, transceiver 124) in the light fixture 102 from surges generated in the line.

In addition, or in the alternative, the power module 112 can be a source of power in itself to provide signals to the other components of the controller 104 and/or the power supply 140. For example, the power module 112 can be a battery. As another example, the power module 112 can be a localized photovoltaic power system. The power module 112 can also have sufficient isolation in the associated components of the power module 112 (e.g., transformers, opto-couplers, current and voltage limiting devices) so that the power module 112 is certified to provide power to an intrinsically safe circuit.

In certain example embodiments, the power module 112 of the controller 104 can also provide power and/or control signals, directly or indirectly, to one or more of the sensor modules 160. In such a case, the control engine 106 can direct the power generated by the power module 112 to the sensor modules 160 of the light fixture 102. In this way, power can be conserved by sending power to the sensor modules 160 of the light fixture 102 when those devices need power, as determined by the control engine 106.

The hardware processor 120 of the controller 104 executes software, algorithms, and firmware in accordance with one or more example embodiments. Specifically, the hardware processor 120 can execute software on the control engine 106 or any other portion of the controller 104, as well as software used by the user 150, the network manager 180, the power source 195, and/or one or more of the sensor modules 160. The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control signals and/or communication signals (e.g., signals 197). Specifically, the transceiver 124 can be used to transfer data between the controller 104 and a user 150 (including an optional transceiver 198), the network manager 180, the power source 195, and/or the sensor modules 160. The transceiver 124 can use wired and/or wireless technology. The transceiver 124 can be configured in such a way that the control and/or communication signals sent and/or received by the transceiver 124 can be received and/or sent by another transceiver that is part of a user 150 (including an optional transceiver 198), the network manager 180, the power source 195, and/or the sensor modules 160. The transceiver 124 can use any of a number of signal types, including but not limited to RF signals (a type of communication signal 197). In some cases, the transceiver 124 can be part of, or at least be in communication with, the antenna assembly 139.

When the transceiver 124 uses wireless technology, any type of wireless technology can be used by the transceiver 124 in sending and receiving signals. Such wireless technology can include, but is not limited to, Wi-Fi, Zigbee, visible light communication, cellular networking, BLE, and Bluetooth. The transceiver 124 can use one or more of any number of suitable communication protocols (e.g., ISA100, HART) when sending and/or receiving signals. Such communication protocols can be stored in the communication protocols 132 of the storage repository 130. Further, any transceiver information for the user 150, the network manager 180, the power source 195, and/or the sensor modules 160 can be part of the stored data 134 (or similar areas) of the storage repository 130.

Optionally, in one or more example embodiments, the security module 128 secures interactions between the controller 104, a user 150 (including an optional transceiver 198), the network manager 180, the power source 195, and/or the sensor modules 160. More specifically, the security module 128 authenticates communication from software based on security keys verifying the identity of the source of the communication. For example, user software may be associated with a security key enabling the software of a user 150 (including an optional transceiver 198) to interact with the controller 104 and/or the sensor modules 160. Further, the security module 128 can restrict receipt of information, requests for information, and/or access to information in some example embodiments.

As mentioned above, aside from the controller 104 and its components, the light fixture 102 can include a power supply 140 and one or more light sources 142. The light sources 142 of the light fixture 102 are devices and/or components typically found in a light fixture to allow the light fixture 102 to operate. The light fixture 102 can have one or more of any number and/or type of light sources 142. The light sources 142 can include any of a number of components, including but not limited to a local control module, a light source, a light engine, a heat sink, an electrical conductor or electrical cable, a terminal block, a lens, a diffuser, a reflector, an air moving device, a baffle, a dimmer, and a circuit board. A light source 142 can use any type of lighting technology, including but not limited to LED, incandescent, sodium vapor, and fluorescent.

The power supply 140 of the light fixture 102 provides power to one or more of the light sources 142. The power supply 140 can be called by any of a number of other names, including but not limited to a driver, a LED driver, and a ballast. The power supply 140 can be substantially the same as, or different than, the power module 112 of the controller 104. For example, the power supply 140 can include one or more of a number of single or multiple discrete components (e.g., transistor, diode, resistor), and/or a microprocessor. As another example, the power supply 140 may include a printed circuit board, upon which the microprocessor and/or one or more discrete components are positioned, and/or a dimmer.

The power supply 140 can include one or more components (e.g., a transformer, a diode bridge, an inverter, a converter) that receives power (for example, through an electrical cable) from the power module 112 of the controller 104 and generates power of a type (e.g., alternating current, direct current) and level (e.g., 12V, 24V, 120V) that can be used by the light sources 142. In addition, or in the alternative, the power supply 140 can receive power from a source external to the light fixture 102. In addition, or in the alternative, the power supply 140 can be a source of power in itself. For example, the power supply 140 can be a battery, a localized photovoltaic power system, or some other source of independent power.

As stated above, the light fixture 102 can be placed in any of a number of environments. In such a case, the housing 103 of the light fixture 102 can be configured to comply with applicable standards for any of a number of environments. This compliance with applicable standards can be upheld when at least a portion of the antenna assembly 139 is integrated with the housing 103 of the light fixture 102.

Figure 2:
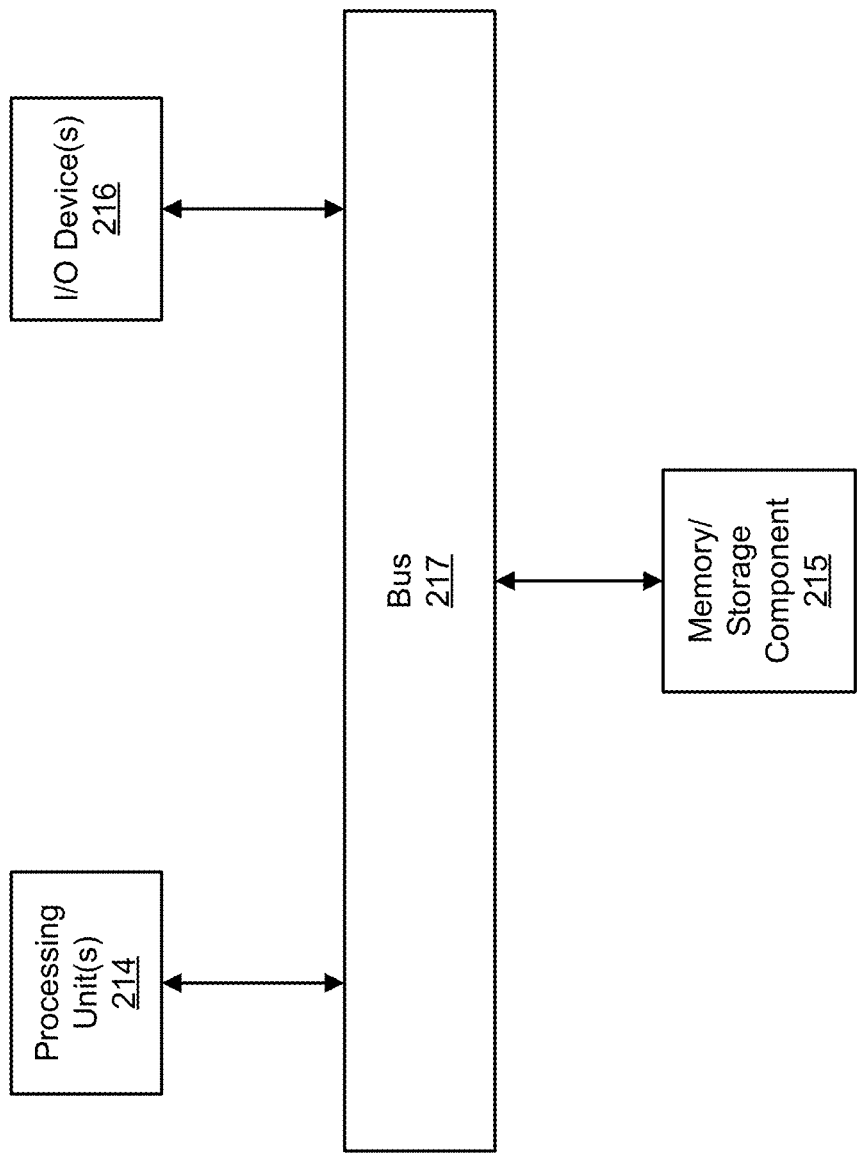
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
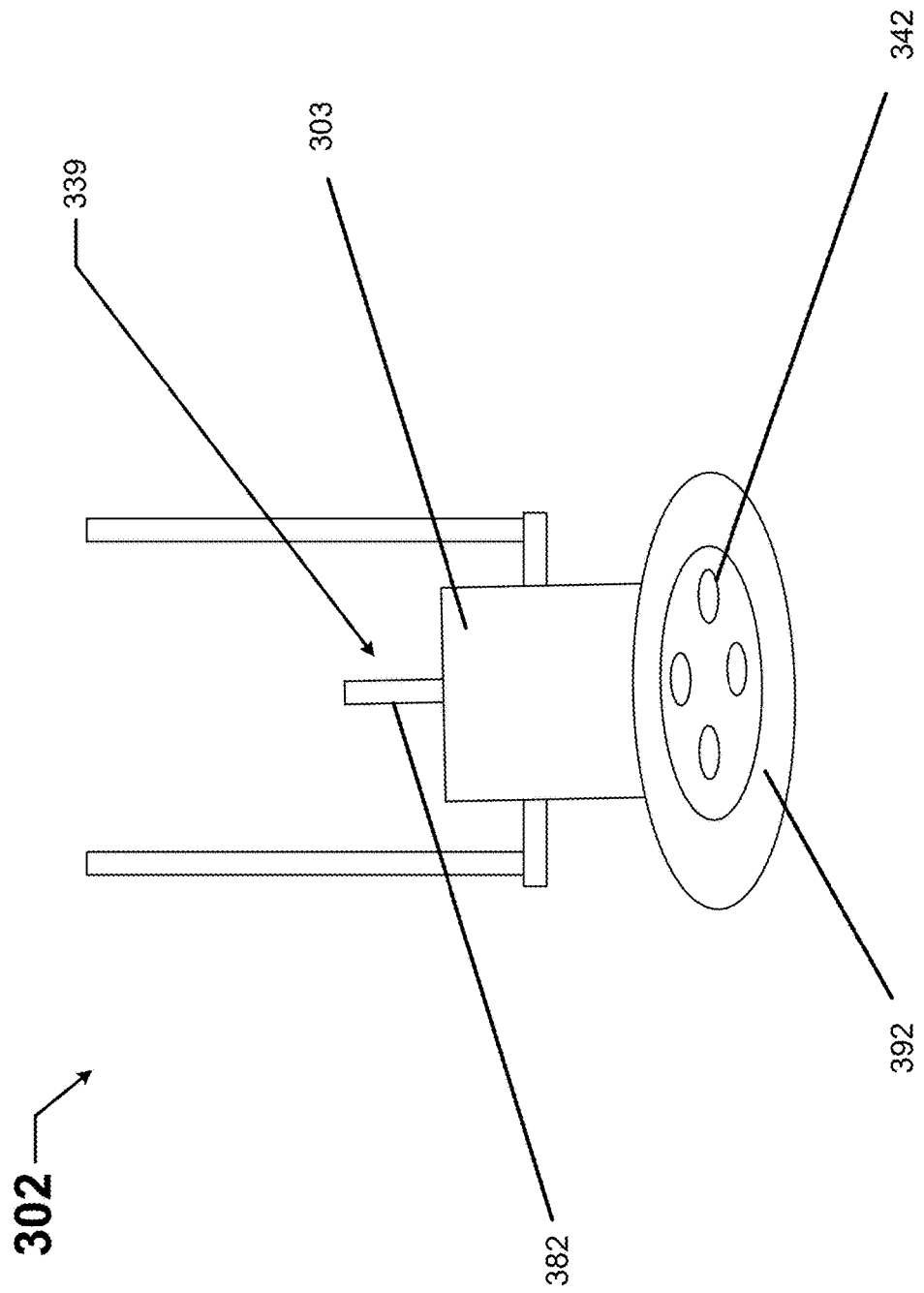
FIG. 3 shows a light fixture currently used in the art.

FIG. 3 shows a light fixture 302 currently used in the art. Referring to FIGS. 1 through 3, the light fixture 302 of FIG. 3 includes a housing 303, a lens 392, a light source 342, and an antenna assembly 339. The antenna assembly 339 of FIG. 3 includes an antenna 382 that extends from the rear of the housing 303. In this way, the antenna assembly 339 of the current art is very noticeable and aesthetically unappealing. Further, because the antenna 382 of the antenna assembly 339 is mounted above the housing 303, it is likely that the housing 303 of the light fixture 302 will offer some signal interference as the antenna 382 sends and/or receives signals (e.g., communication signals 197).

Figure 4:
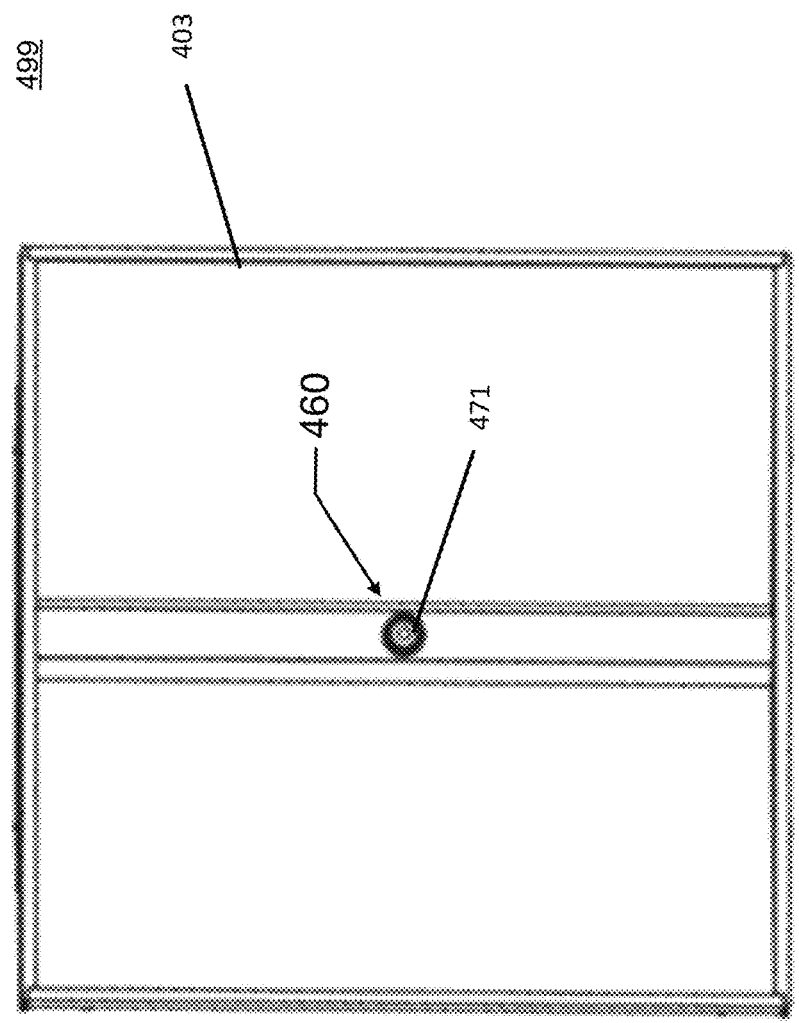
FIG. 4 shows a bottom view of another light fixture currently used in the art.

FIG. 4 shows a bottom view of another light fixture 402 currently used in the art. Referring to FIGS. 1 through 4, the light fixture 402 of FIG. 4 is disposed in an ambient environment 499 and includes a sensor module 460 that is coupled to the housing 403 of the light fixture 402. In this case, the sensor module 460 includes an occupancy sensor (hidden from view) and a lens 471. The lens 471 is used to direct infrared energy to the sensor. The sensor module 460 protrudes outward from the housing 403 of the light fixture 402 and is visible when the light fixture 402 is installed. As a result, the sensor module 460 of the current art is very noticeable and aesthetically unappealing.

FIG. 5 shows a light fixture 502 with an antenna assembly 539 in accordance with certain example embodiments. Referring to FIGS. 1 through 5, the light fixture 502 of FIG. 5 is a street light that is disposed in an ambient environment 499 and includes a housing 503. The housing 503 has a window (e.g., an aperture) on its bottom side that is covered by a lens 592. The lens 592 forms a light cavity with the housing. Inside of the light cavity is a circuit board 591 on which can be disposed a number of light sources 542.

Disposed on the housing 503, in this case adjacent to the lens 592 on the bottom side of the housing 503, is an antenna assembly 539. The visible components of the antenna assembly 539 of FIG. 5 are the antenna 582 and the connection tail 581, which is coupled to the antenna 582 using a communication link 505 (e.g., a wire, an electrically conductive lead). In this case, the antenna 582 of the antenna assembly 539 is printed on an outer surface of the housing 503 of the light fixture 502. Any of a number of printing techniques can be used to print the antenna 582 onto the outer surface of the housing 503. For example, an additive printing technique can be used.

There can be an aperture in the housing 503 that allows a sensor module (hidden from view in FIG. 5) to couple to the connection tail 581 of the antenna assembly 539. Such an aperture can allow the connection tail 581, the communication link 505, and/or a portion of the sensor module to be disposed therein. Alternatively, a portion of the antenna assembly 539 and/or the corresponding sensor module can be printed on an inner surface of the housing 503 of the light fixture 502.

If the sensor module includes an occupancy sensor, then the antenna 582 can be passive or powered. In either case, the antenna 582 would transmit signals (e.g., communication signals 197) with radio frequency identification (RFID) readers (e.g., a name badge, an employee identification, a visitor pass) to detect changes (e.g., in amplitude, in frequency) in the RFID signal that indicate occupancy in a volume of space adjacent to the light fixture 502. Printing the antenna 582 and other components of the antenna assembly 539 directly on the housing 503 allows for an aesthetically integrated antenna 503 that is not impeded (little or no signal interference) by the housing 503. The printing process can use color matching to result in the portions of the antenna assembly 539 that are printed on the outer surface of the housing 503 to be substantially undetectable.

FIG. 6 shows a light fixture 603 with an antenna assembly 639 in accordance with certain example embodiments. Referring to FIGS. 1 through 6, the light fixture 602 of FIG. 6 is a different street light that is disposed in an ambient environment 499 and includes a housing 603. The housing 603 has a window (e.g., an aperture) on its bottom side that is covered by a lens 692. The lens 692 forms a light cavity with the housing. Inside of the light cavity is a circuit board 691 on which can be disposed a number of light sources 642.

Disposed on the housing 603, in this case adjacent to the lens 692 on the bottom side of the housing 603, is an identification medium 679. Examples of an identification medium 679 can include, but are not limited to, a nameplate, a warning label, and an information label. The identification medium 679 can be coupled to the housing 603 of the light fixture 602 in one or more of any of a number of ways, including but not limited to adhesion, riveting, welding, epoxy, and screws.

Disposed on (e.g., integrated with) the identification medium 679 in this case is an antenna assembly 639 (or portions thereof). The visible components of the antenna assembly 639 of FIG. 6 are the antenna 682 and the communication link 605, which couples to a connection tail 681 of the antenna assembly 639, where the connection tail is tucked behind the identification medium 679. In this case, the antenna 582 of the antenna assembly 539 is printed on an outer surface of the identification medium 679. Any of a number of printing techniques can be used to print the antenna 582 onto the outer surface of the identification medium 679. For example, an additive printing technique can be used.

There can be an aperture in the housing 603 that allows a sensor module (hidden from view in FIG. 6) to couple to the connection tail 681 of the antenna assembly 639. Such an aperture can allow the connection tail 681, the communication link 605, and/or a portion of the sensor module to be disposed therein. Alternatively, a portion of the antenna assembly 639, the identification medium 679, and/or the corresponding sensor module can be printed on an inner surface of the housing 603 of the light fixture 602. In some cases, the connection tail 681 can be part of the identification medium 679.

If the sensor module includes an occupancy sensor, then the antenna 682 can be passive or powered. In either case, the antenna 682 would transmit signals (e.g., communication signals 197) with RFID readers (e.g., a name badge, an employee identification, a visitor pass) to detect changes in the RFID signal that indicate occupancy in a volume of space adjacent to the light fixture 602. By printing the antenna 682 and other components of the antenna assembly 639 on the information medium 679, which in turn is coupled to the outer surface of the housing 603, allows for an aesthetically integrated antenna 603 that is not impeded (little or no signal interference) by the housing 603. The printing process can use color matching to result in the portions of the antenna assembly 639 that are printed on the outer surface of the identification medium 679 to be substantially undetectable relative to the identification medium 679 and/or the housing 603.

FIG. 7 shows a subassembly 799 of another light fixture in accordance with certain example embodiments. Referring to FIGS. 1 through 7, the subassembly 799 of FIG. 7 does not include a housing, as in FIGS. 5 and 6, but rather includes only a lens 792 that covers a circuit board 791 on which are disposed a number of light sources 742. In FIG. 7, the lens 792 and the circuit board 791 are separated from each other. Also disposed on the circuit board 791 is a power source 740, one or more sensor modules 760 (e.g., light sensors), and an antenna assembly 739, all of which are electrically coupled to each other using communication links 705, which in this case are trace wiring on the circuit board 791.

The antenna assembly 739 (or portions thereof) can be disposed on any portion of the circuit board 791. In this case, the antenna 782, the connection tail 781, and the communication link 705 that couples those two components of the antenna assembly 739, are disposed on (integrated with) the outer surface of the circuit board 791 that has a line of sight with the ambient environment. If these components of the antenna assembly 739 are printed on the circuit board 791, then any of a number of printing techniques can be used to print the antenna 582 onto the outer surface of the housing 503. For example, an additive printing technique can be used.

One or more sensor modules 760 can be mounted on the circuit board 791, and one or more of those sensor modules 760 (and/or one or more other sensor modules 760 of a light fixture that are not mounted on the circuit board 791) can be coupled to and utilize the antenna assembly 739. The circuit board 791 can be constructed from any of a number of materials, including but not limited to FR4, MCPCB (metal core pcb), flex circuit, and TFPCB (thick film pcb). The advantage of printing portions of the antenna assembly 739 directly to the circuit board 791 is that the connections from the antenna assembly 739 to the power source 740 are made at the circuit board level, resulting in more reliable electrical connections.

In one or more example embodiments, example embodiments can be integrated directly with a light fixture (or other electrical device) or with a component (e.g., an identification medium) that is directly coupled to a light fixture (or other electrical device). Example embodiments can work with a sensor device of the light fixture. In addition, or in the alternative, example embodiments can be used by a local or network controller for communication purposes. Example embodiments can be printed so that the antenna assembly (or portions thereof) have a very low or non-existent protruding profile. Color matching can be used to blend the antenna assembly (or portions thereof) into the light fixture. One or more antenna assemblies (or portions thereof) can be disposed at locations on the light fixture to provide maximum range with little or no signal interference by the light fixture. Example embodiments can provide reliable, real-time capability of a sensor module within a volume of space. Using example embodiments described herein can improve communication, safety, maintenance, costs, and operating efficiency.

Accordingly, many modifications and other embodiments set forth herein will come to mind to one skilled in the art to which integrated antenna assemblies for light fixtures pertain having the benefit of the teachings presented in the foregoing descriptions and the associated drawings. Therefore, it is to be understood that integrated antenna assemblies for light fixtures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A light fixture disposed in an ambient environment, wherein the light fixture comprises:
    at least one light source;
    a sensor module that measures a parameter, wherein the parameter is used to operate the at least one light source; and
    an antenna assembly coupled to the sensor module, wherein at least a portion of the antenna assembly is disposed on an exposed component, wherein the exposed component has a substantially unobstructed line of sight with the ambient environment, wherein the antenna assembly is used to receive at least one communication signal in the ambient environment, wherein the at least one communication signal is associated with a measurement of the parameter made by the sensor module.

2. The light fixture of claim 1, wherein the sensor module comprises an occupancy sensor, and wherein the parameter is occupancy of a volume of space in the ambient environment.

3. The light fixture of claim 1, wherein the at least one communication signal comprises a radio frequency (RF) signal.

4. The light fixture of claim 3, wherein the sensor module, using the antenna assembly, is configured to communicate with at least one RF identification reader.

5. The light fixture of claim 4, wherein the sensor module is configured to detect movement of the at least one RF identification reader based on the RF signal received by the antenna assembly.

6. The light fixture of claim 1, wherein the exposed component comprises a housing of the light fixture.

7. The light fixture of claim 1, wherein the exposed component comprises a circuit board disposed within a lighting cavity.

8. The light fixture of claim 1, wherein the exposed component comprises a lens of the light fixture.

9. The light fixture of claim 1, wherein the portion of the antenna assembly is printed on the exposed component.

10. The light fixture of claim 1, wherein the antenna assembly comprises an antenna.

11. The light fixture of claim 10, wherein the antenna assembly further comprises a connection tail that couples to the sensor module and to the antenna.

12. The light fixture of claim 11, wherein the connection tail traverses a thickness of the exposed component.

13. The light fixture of claim 11, wherein the antenna assembly further comprises a communication link that transfers data between the antenna assembly and the sensor module.

14. The light fixture of claim 1, wherein the exposed component is an information medium that is coupled to an outer surface of a housing of the light fixture.

15. An electrical assembly for detecting occupancy for operation of a light fixture, the electrical assembly comprising:
    an antenna assembly that sends and receives radio frequency signals; and
    an occupancy sensor coupled to the antenna assembly, wherein the occupancy sensor generates the signals that are sent by the antenna assembly, wherein the occupancy sensor interprets the signals that are received by the antenna assembly,
    wherein at least a portion of the antenna assembly is configured to be integrated with an exposed component of the light fixture, wherein the exposed component has a substantially unobstructed line of sight with the ambient environment.

16. The electrical assembly of claim 15, wherein the antenna assembly comprises an antenna and a connection tail coupled to the antenna, wherein the antenna is configured to be printed onto the exposed component of the light fixture.

17. The electrical assembly of claim 16, wherein at least a portion of the connection tail is further printed onto the exposed component of the light fixture.

18. The electrical assembly of claim 15, wherein the electrical assembly further comprises:
    at least one communication link that facilitates communication between the antenna assembly and the occupancy sensor.

19. The electrical assembly of claim 15, wherein at least one measurement made by the occupancy sensor is configured to be used to operate the light fixture.

20. A light fixture disposed in an ambient environment, wherein the light fixture comprises:

at least one light source;

a sensor module that measures a parameter, wherein the parameter is used to operate the at least one light source; and an antenna assembly coupled to the sensor module, wherein at least a portion of the antenna assembly is disposed on an exposed component, wherein the exposed component has a substantially unobstructed line of sight with the ambient environment, wherein the antenna assembly is used to transmit at least one communication signal in the ambient environment, wherein the at least one communication signal is associated with a measurement of the parameter made by the sensor module.

* * * * *